(12) United States Patent
Toillon et al.

(10) Patent No.: US 7,483,382 B1
(45) Date of Patent: Jan. 27, 2009

(54) DEVICE FOR SECURELY MONITORING DATA SWITCHING

(75) Inventors: Patrice Toillon, Saint Germain en Laye (FR); Eric Tiriou, Magny les Hameaux (FR); Marc Peythieux, Gif sur Yvette (FR)

(73) Assignee: Thales Avionics S.A., Velizy-Villacoublay (FR)

( * ) Notice: Subject to any disclaimer, the term of this patent is extended or adjusted under 35 U.S.C. 154(b) by 775 days.

(21) Appl. No.: 10/049,647

(22) PCT Filed: Aug. 23, 2000

(86) PCT No.: PCT/FR00/02360

§ 371 (c)(1),
(2), (4) Date: Aug. 19, 2002

(87) PCT Pub. No.: WO01/15371

PCT Pub. Date: Mar. 1, 2001

(30) Foreign Application Priority Data

Aug. 23, 1999 (FR) .................................. 99 10698

(51) Int. Cl.
*G01R 31/08* (2006.01)
(52) U.S. Cl. .................. 370/242; 370/389; 370/401
(58) Field of Classification Search ................ 370/389, 370/328, 392, 351, 401, 242; 713/200, 201; 726/2, 3, 11, 13
See application file for complete search history.

(56) References Cited

U.S. PATENT DOCUMENTS

| | | | |
|---|---|---|---|
| 5,680,390 A | 10/1997 | Robrock, II | |
| 5,715,247 A | 2/1998 | Yoshizawa et al. | |
| 5,790,799 A | 8/1998 | Mogul | |
| 6,041,058 A * | 3/2000 | Flanders et al. | 370/401 |
| 6,115,376 A * | 9/2000 | Sherer et al. | 370/389 |
| 6,172,991 B1 * | 1/2001 | Mori | 370/474 |
| 6,233,236 B1 * | 5/2001 | Nelson et al. | 370/359 |
| 6,421,348 B1 * | 7/2002 | Gaudet et al. | 370/401 |
| 6,510,151 B1 * | 1/2003 | Cioli et al. | 370/352 |
| 6,553,000 B1 * | 4/2003 | Ganesh et al. | 370/235 |
| 6,650,639 B2 * | 11/2003 | Doherty et al. | 370/389 |
| 6,819,655 B1 * | 11/2004 | Gregson | 370/242 |
| 6,882,654 B1 * | 4/2005 | Nelson | 370/401 |
| 2007/0087771 A1 * | 4/2007 | Noble et al. | 455/522 |

* cited by examiner

*Primary Examiner*—Hassan Kizou
*Assistant Examiner*—Jeffrey M Rutkowski
(74) *Attorney, Agent, or Firm*—Oblon, Spivak, McClelland, Maier & Neustadt, P.C.

(57) ABSTRACT

A multichannel digital switching unit including a connection interface between circuits that provides the physical links to a transmitting environment defining the ports and a processing unit that switches multi-field data frames between the different ports. A frame monitoring device include a probe module that is selectively linked to the connection interface and a surveillance module that analyzes contents of at least a part of each data frame processed by the probe and generates a warning signal when the part that is analyzed fails to fulfil a chosen criterion.

38 Claims, 3 Drawing Sheets

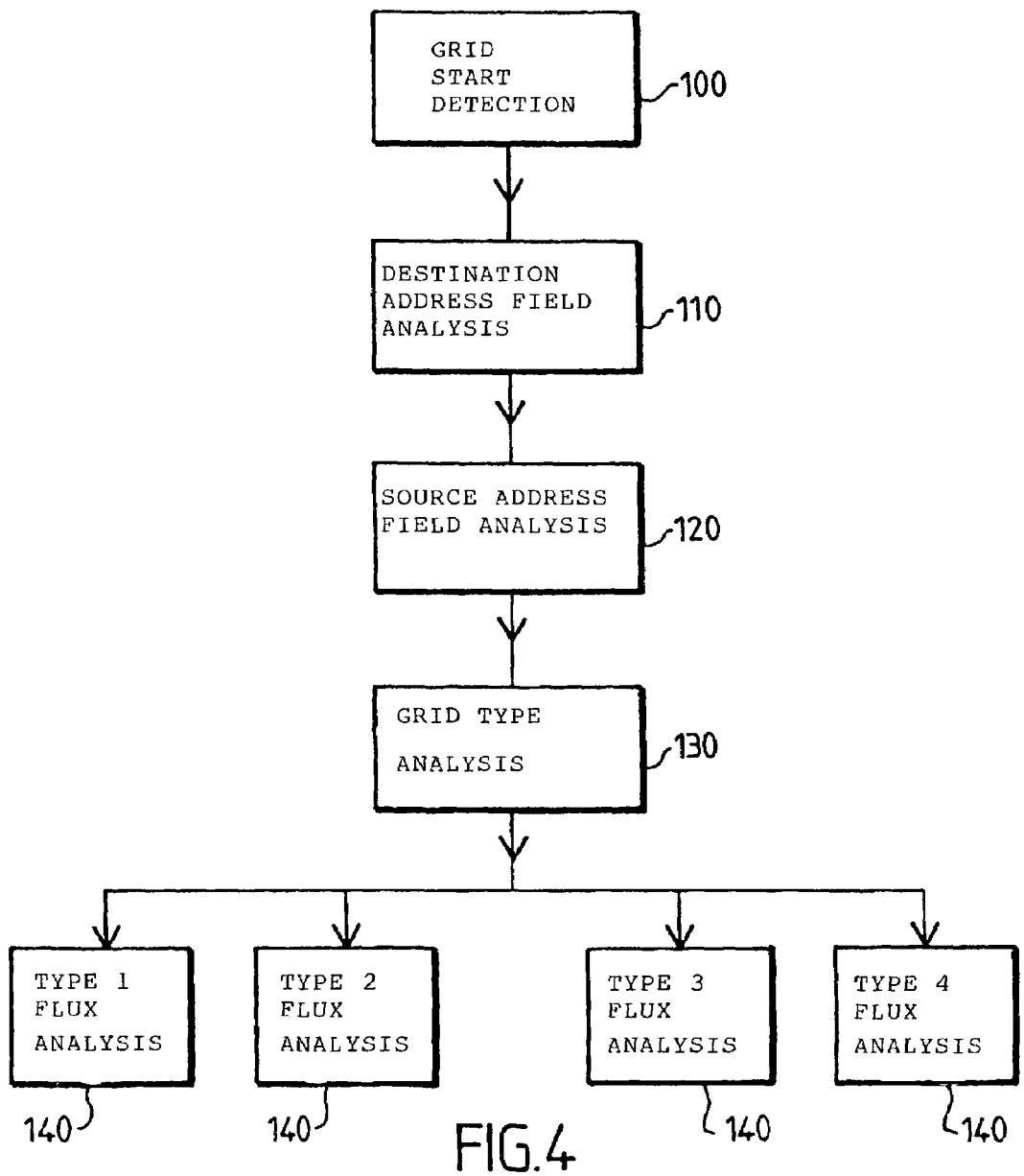

DEVICE FOR SECURELY MONITORING DATA SWITCHING

BACKGROUND OF THE INVENTION (1) Field of the Invention

The invention relates to the field of switching data grids (or cells), and in particular monitoring devices for a multichannel numeric switch.

(2) Description of the Related Art

The word "grid" is to be taken in its widest sense here, in that it designates all types of messages formed of a multiplicity of fields sequenced according to predetermined formats. In the same way, the word "data" is to be taken in its widest sense, in that it designates all data contained in a message, including the data relating to the message transmitter (or source), the destination(s) of this message, or even the type of message.

Such switches conventionally comprise physical connection circuits, generally referred to as the "physical layer", connected to a transmission medium which defines the source (or input) communication ports and/or destination (or output) communication ports, to which articles of IT hardware (or machines) are connected. They also comprise a processing unit, generally referred to as the "logic layer", and a connecting interface between the processing unit and the connecting circuits, for each of the ports, selectively. The processing unit ensures numeric switching of multifield data grids between the different ports, i.e. between a source port and at least one destination port.

These switches therefore form part of a communication installation in which independent physical links permit separation of the data in a manner known as "segmented" and not "diffused".

In order to ensure good functioning of such an installation the data received by one (or more) destination machine(s) (which will be likened hereinafter to the destination or output communication port to which it is "attached") must be substantially identical to those transmitted by the source machine (which will be likened hereinafter to the source or input communication port to which it is "attached").

Due to the complexity of the various connections, the very nature of the transmission media, and the conditions in which the grid exchanges take place, it frequently happens that certain grids deteriorate during their transfer from the source machine to the destination machine. This is particularly so with "COTS"-type switches, which are very widely used in information technology and telecommunications, due in particular to their low cost and the virtually universal format of the grids.

This disadvantage makes switches of the above-mentioned type difficult to use, indeed even unusable, in certain fields of application where the protection of the data is of great importance. This is the case in avionics where the management and control of flight is concerned.

Moreover, it is important that breakdowns and/or loss of functioning are treated.

BRIEF SUMMARY OF THE INVENTION

The object of the present invention is therefore to procure a monitoring device for a multichannel numeric switch intended to improve the situation mentioned above, particularly where security is concerned.

It proposes to this end a device of the type described in the introduction, wherein a probe unit coupled selectively to the connecting interface is provided, together with a monitoring unit capable of analysing the content of at least part of every grid (or cell) of data seen by the probe unit, and to generate a warning signal when the analysed part does not meet a selected condition.

It is thus possible to access, in a non-intrusive and selective manner, and on each of the ports being monitored (not necessarily all), every part of each grid in the process of switching in the switch, so as to monitor the coherence of the content of that grid.

In a currently preferred embodiment, the monitoring unit is so conceived as to trigger the processing unit, by means of the warning signal, to reject the grid seen by the probe unit. In this manner, every grid having an incoherence, of whatever type, is rejected: in other words, it is not presented to the output of the switch.

In a modification of this embodiment, the monitoring unit is so conceived as to trigger itself, with the warning signal, rejection of the grid seen by the probe unit. This saves time.

In another modification, the monitoring unit is so conceived as to make compatible the warning signals associated with each port, and to trigger rejection, either by itself, or by the processing unit, of the grid seen by the probe unit, when the number of warning signals made compatible for one port is higher than a certain threshold.

Conversely, the monitoring unit can be so adapted as to make compatible each rejection associated with each port being monitored and to trigger invalidation of the connection between a port and the connection circuits when the number of rejections made compatible for this port is higher than a certain threshold. Obviously, such invalidation is preferably temporary, so that once the problem has been resolved at the faulty port, this can be used again for transmission and/or reception (or validated).

The invention applies particularly, but not in a limiting way, to switches equipped with interfaces adapted to the standard formats of multifield grids selected from ETHERNET, ATM and HIGH-SPEED LINK.

Furthermore, the invention also relates to switches equipped with a monitoring device of the type described above, as well as communication installations which comprise one or more switch(es) equipped with such a device. It applies particularly to communication installations used in avionics for managing and controlling flight.

BRIEF DESCRIPTION OF THE SEVERAL VIEWS OF THE DRAWINGS

Further features and advantages of the invention will appear from the detailed description below and from the attached drawings, in which:

FIG. 3 is a diagram illustrating a grid with the ETHERNET format;

FIG. 4 is a block circuit diagram illustrating a processing mode of a grid having ETHERNET format.

The attached drawings comprise elements of a certain character which it is difficult to define fully by the text. Consequently, they may contribute to the definition of the invention.

DETAILED DESCRIPTION OF THE INVENTION

The invention relates to a device for monitoring messages or grids, or even cells, in the process of switching in a multichannel numeric switch.

Such a switch is intended to receive messages transmitted by machines (or more generally information technology hardware) according to a predetermined format with a view to switching them towards one or more other machines. The machine that transmits a message is called the source machine, whereas the machine that is the destination of a message is called the destination machine. Obviously, one and the same machine can be source and/or destination by turns or simultaneously.

Figure 1:
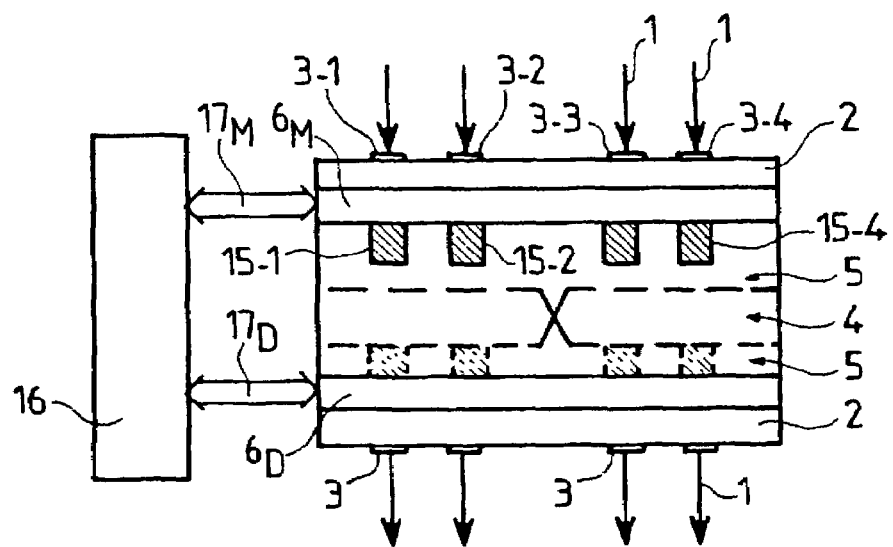
FIG. 1 shows diagrammatically and in a simplified form a switch equipped with a monitoring device according to the invention.
Figure 2:
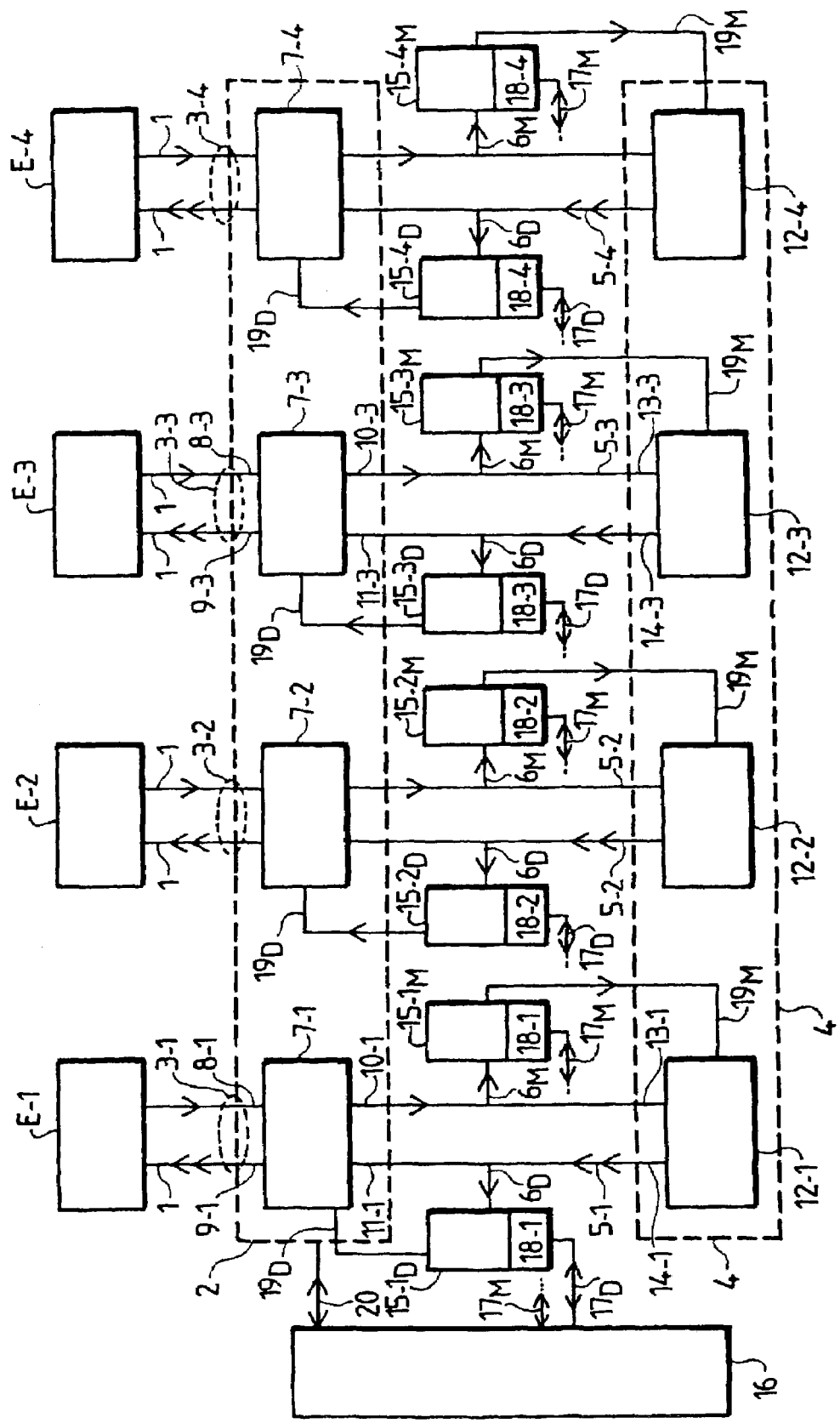
FIG. 2 details diagrammatically a monitoring device according to the invention.

As is illustrated in FIGS. 1 and 2, each machine E-i (here i=1 to 4) is connected to the switch by the bias of a transmission medium 1, which may be a cable or optic fibre, or even the ether when the messages are transmitted via waves. This transmission medium may be mono- or bi-directional.

The end of the transmission medium 1, which is opposed to the machine E-i, is connected to physical connecting circuits 2, which form a physical interface or physical layer. The place where the connection is made between the physical layer 2 and the various transmission media is conventionally called port 3. In the switch, each port 3 is associated with a port identification which may be used either as a source (or input) port local address, or as a destination (or output) port local address, according to whether the machine to which this port is connected transmits the message (or data grid) or is the destination thereof.

On the physical layer 2 (or physical connection circuits), the ports 3 are installed in series (see FIG. 1).

In a conventional switch (i.e. from the prior art), the switching of a grid arriving at a port 3 of the physical layer 2 is effected by a processing unit 4, which is called the logic layer, or again a switching logic interface.

The logic layer 4 is connected to the physical layer 2 via a connecting interface 5.

In fact, as is illustrated in FIG. 2, in the ETHERNET or ATM-type switches, the physical layer 2 comprises a large number of transmitters/receivers 7-i comprising an analogue input 8-i, an analogue output 9-i, a numeric output 10-i and a numeric input 11-i. In the example shown in FIG. 2, the switch being of the "4×4" type, the variable i assumes values of between 1 and 4.

Furthermore, in these switches, the processing unit 4 (or logic layer) is composed of a large number of switching elements 12-i associated respectively with a transmitter/receiver 7-i. The connecting interface 5 can therefore be subdivided into bi-directional (5-i) parts, each permitting connection of the numeric output 10-i of a transmitter/receiver 7-i to the numeric input 13-i of a switching element 12-i, and of the numeric output 14-i of the switching element 12-i to the numeric input 11-i of the transmitter/receiver 7-i.

The various switching elements 12-i of the logic layer 4 are interconnected so that upon reception of a grid at the numeric input 13-i of one of them, this grid can be transmitted to one (or more) of these switching elements 12-j, associated with the transmitter/receiver(s) 7-j which supplies/supply the port (s) 3-j designated via the destination field address contained in the grid to be switched.

The physical connection circuits 2 are called the physical layer 2 because they receive analogue data from the ports 3-i and transmit numeric data to the processing unit 4, via the connecting interface. The processing unit 4 is called the logic layer because it receives, processes and transmits numeric data.

The grids which are exchanged in such a switch have a particular format known as 'multifield', of the type illustrated in FIG. 3 (ETHERNET format).

Such a multifield grid comprises, at least, a grid start field, a destination address field, a source address field and a data field. In a communication installation, these different fields are always sequenced in the same manner.

A certain number of standard formats use multifield grids of the type described above, with or without complementary field(s). One might cite for example standard formats of the ETHERNET, ATM and HIGH-SPEED LINK (HS LINK) types.

Many manufacturers market switches capable of operating according to the above-mentioned formats. One can cite for example ETHERNET switches by the firms CISCO, 3COM, INTEL, IBM, HEWLETT PACKARD, D-LINK etc. As these switches are very widespread in the market, there is no need to describe them here. Those that belong to the category known as "COTS" (for "Commercial of the Shelves", i.e. "component widely used commercially") have the advantage of processing grids whose format is universally used, unlike other specific formats, such as that of the ARINC standard (429 or 629).

By way of example, one might use an ETHERNET connecting interface of the type "medium independent interface" (MII) or its improvements such as, for example, RMII (Reduce MII), or a UTOPIA-type ATM connecting interface.

Whatever the format of the communication installation, a grid arrives by a source port 3-i, is transferred to the transmitter/receiver 7-i of the physical layer 2, borrows the part 5-i of the connecting interface 5 which is connected to the transmitter/receiver 7-i in order to reach the switching element 12-i of the logic layer 4. There its destination address field is analysed so as to determine the corresponding destination port 3-j. The grid is therefore communicated to the switching element 12-j, then to the transmitter/receiver 7-j via the part 5-j of the connecting interface, in order to be transmitted by the port 3-j.

As was indicated in the introduction, it frequently occurs that switching grids deteriorate before arriving at the switch, or even that the switch causes the grids received to deteriorate during switching.

The object of the invention is to improve the situation, and to this end the invention proposes a device for monitoring the coherence of data grids which are switched in a multichannel numeric switch between a source port and one or more destination ports.

Such a device first comprises a probe unit 6 capable of observing during broadcast on the connecting interface 5 the data grids which are in transit between the physical layer 2 and the logic layer 4. Hereinafter, a transmission from the physical layer 2 towards the logic layer 4 will be referred to as 'rising', and transmission from the logic layer 4 towards the physical layer 2 as 'falling'.

The Applicant has found in fact that it was particularly advantageous to observe the rising and/or falling grids on the various parts 5-i of the connecting interface. This is because the data circulating on this interface 5 are numeric and totally representative, being identical thereto, of the data of the grids to be switched.

The probe unit 6 according to the invention observes each part 5-i of the connecting interface which connects a switching element 12-i to a transmitter/receiver 7-i. In the example shown, this observation is effected on each rising part 5-iM and on each falling part 5-iD. Obviously, one could carry out observations only on one or more rising parts, or only on one or more falling parts, or even on certain rising parts and certain falling parts.

It is therefore possible to observe the grids selectively.

In the example in FIG. 2, each rising part 5-*i*M of the connecting interface is observed independently of the other rising parts by a probe sub-unit 6-*i*M, and each falling part 5-*i*D of the connecting interface is observed independently of the other falling parts by a probe sub-unit 6-*i*D. This ensures the independence of the observations carried out on the rising part from those carried out on the falling part. Each probe sub-unit can be realised as a connection.

Each probe sub-unit 6-*i*M supplies a rising monitoring sub-unit 15-*i*M, and each probe sub-unit 6-*i*D feeds a falling monitoring sub-unit 15-*i*D.

These different monitoring sub-units 15-*i* together form a monitoring unit 15. However, it is preferable, but not indispensable that the probe sub-units 15-*i*M and 15-*i*D physically form one and the same sub-unit 15-*i* in the sense that they manage one and the same port 3-*i*.

Each rising 15-*i*M and falling monitoring sub-unit 15-*i*D is conceived to analyse at least part of a field of the grid being observed which circulates on the part of the connecting interface 5 concerned. Consequently, each monitoring sub-unit 15-*i*, rising or falling, is capable of recognising from the fields transmitted thereto by the associated probe sub-unit 6-*i* the field or fields which it must analyse. Preferably, each monitoring sub-unit 15-*i* is configured (or programmed) so as to analyse successively, i.e. as they are transferred from a transmitter/receiver 7-*i* to an associated switching element 12-*i*, or reciprocally, plural fields of one and the same grid, and in particular the destination address field, the source field address and the grid type field.

The various monitoring sub-units 15-*i*, whether rising or falling, can have different configurations according to the type of machine whose switching they monitor in a selective manner. Thus, local monitoring units are formed which are adapted to the needs of each port 3-*i*.

Management of the configuration of each sub-unit 15-*i* is carried out, preferably, by a part of the device according to the invention coupled to the monitoring unit 15. This part, which is known as the monitoring unit 16, receives and transmits numeric "data" to the different monitoring sub-units 15-*i* via a (rising) connection 17M or a (falling) connection 17D.

As will be seen below, the monitoring unit 16 carries out preferably other tasks than the management of the sub-modules' configuration.

In order to describe the monitoring mechanism carried out by a monitoring device according to the invention, FIGS. 3 and 4 will now be referred to.

FIG. 3 shows a grid with the ETHERNET format. As indicated above, it comprises a grid start field, then a destination address field (also known as MAC destination address), then a source address field (also known as MAC source address), then a grid type field. It then comprises a data field and a CRC field (English acronym standing for Cyclic Redundancy Check).

The fields of a multifield grid are transmitted one by one in the order indicated above when the grid is transferred from the physical layer 2 to the logic layer 4, and vice versa. It is therefore possible to analyse the content of at least part of one or more fields which follow one another in order to verify the coherence of the grid (or cell).

Obviously the grids which have formats other than ETHERNET will not have exactly the same configuration as that shown in FIG. 3. For example, in the ATM format, after the grid start, the first field is a field known as "Virtual Path Identifier", the second field is a field known as "Virtual Channel Identifier", and the third field is a field known as "Payload Type". Thereafter is a field of priority and monitoring, and a data field.

In a more general manner, a grid may comprise at least one or more so-called physical fields which designate one or more physical "channels", such as a source port or a destination port, one or more fields known as logic fields, which designate one or more logic "channels" such as a flux, and a data field.

As is illustrated in FIG. 4, in the case of a grid of ETHERNET format being transferred from the transmitter/receiver 7-*l* to the associated switching element 12-*l*, the rising part 6-*l*M of the probe unit, which is connected to the rising part 5-*l*M of the connecting interface, transmits as soon as it observes the same the grid start field to the monitoring sub-unit 15-*l*M. This sub-unit is thus warned that it will have to analyse a rising data grid. This forms the stage 100, which will be discussed below in the context of a dynamic analysis of the grids.

As soon as the second destination address field is observed (and therefore reconstituted) by the rising part 6-*l*M of the probe unit, it is transmitted to the monitoring sub-unit 15-*l*M in order to be analysed in a stage 110.

This analysis is intended to check whether the address of the destination of the grid corresponds to one of the ports 3-*i*. managed by the switch. To this end, the monitoring unit 15 comprises a memory 18 in which is found stored a table of correspondence between each port 3-*i* of the switch and the destination addresses authorised for this port. By a juxtaposition between the data contained in the field and those contained in the table of correspondence, one can check instantly the grid-port coherence, i.e. give or refuse authority to communicate with the port designated by the destination address.

The table of correspondence can be shared by all the monitoring sub-units 15-*i*, but may also, as is illustrated in FIG. 2, be subdivided into plural (i) parts associated respectively with the different ports. In this case, each monitoring sub-unit 15-*i*. comprises a modifiable memory 18-*i*, such as a live memory, a bank of registers each associated with a port and having an individually configurable content, or, even better, a flash-type memory, which contains the list of grids (messages, cells) authorised for each port 3-*j*. The expression 'list of grids' must be taken in a wide sense. It includes for each port all the ports with which it can exchange grids, the different types of grids authorised, the lengths of grid according to the type of flux, etc.

Preferably, the modifiable memory 18 can be accessed for reading and/or writing so as to permit monitoring of its content.

If the address is incoherent, the monitoring sub-unit 15-*l*M transmits, in this embodiment, to the monitoring unit 16, via the connection 17M, a warning signal indicating an incoherence in the address of the destination port.

Two embodiments can be considered possible at this stage. In a first embodiment, upon receipt of the warning signal, the monitoring unit 16 will address to the switching element 12-*l* a signal ordering it not to transfer the grid being transferred. This therefore brings about rejection of the grid.

In a second embodiment, each monitoring sub-unit 15-*i*M acts directly on the switching element 12-*i* associated therewith, without the need to pass through the monitoring unit 16. To this end it comprises an output 19M which is connected to the switching element 12-*i* in order to send thereto the warning signal intended to trigger rejection of the grid being transferred. However, the monitoring unit 16 is preferably warned by each monitoring sub-unit 15-*i*. or by each switching element 12-*i*, of each rejection associated with each port, so as to make compatible for each port, whether source or destination, the number of grid rejections of which it is the object.

The rejections (or warning signals) may be made compatible for both above-mentioned embodiments. The monitoring unit 16 may thus, when the number of rejections associated with a port 3-*i* exceeds a selected threshold, e.g. six, decide to invalidate this port 3-*i*. To this end, the monitoring unit 16 is connected by a connection 20 to the physical layer 2, and preferably to each of its transmitters/receivers 7-*i*.

Obviously, different invalidation thresholds can be considered for different ports, according to need, and in particular according to the degree of security required at each port.

It is conceivable that the monitoring unit 16 have the option of forcing the switching of a grid, even when a monitoring sub-unit 15-*i*. has triggered rejection of the grid in the associated switching element 12-*i*.

For processing descending grids, there is provided, instead of the connection 17M, a connection 17D between each monitoring sub-unit 15*i*D and the monitoring unit 16, in order to transmit the warning signal intended to trigger rejection of a descending grid being transferred. Obviously, as indicated above, each monitoring sub-unit 15-*i*D could act directly on the transmitter/receiver 7-*i*. associated therewith, without the need to pass through the monitoring unit 16. It comprises in this case an output 19D connected to the transmitter/receiver 7-*i*. in order to send thereto the warning signal intended to trigger rejection of the grid being transferred. Nevertheless, when a monitoring unit 16 is provided, it is warned preferably by each monitoring sub-unit 15-*i*. (e.g. via the connection 17) or by each transmitter/receiver 7-*i*. (e.g. by the connection 20 which is in this case bi-directional), of each rejection associated with each port, so as to make compatible for each port, whether source or destination, the number of grid rejections of which it is the object.

In a modification, a mode of grid rejection is conceivable which operates by making warning signals compatible. In this case, the monitoring unit 16 makes compatible for each port 3-*i* the warning signals (or incoherence signals) which are supplied by the monitoring sub-units 15-*i*M and 15-*i*D, so that only an incoherent grid arriving after N preceding incoherent grids is rejected. N designates here a threshold number which may be each, for example, to four or five. Obviously, each monitoring sub-unit 15-*i*. could carry out this operation of making warning signals compatible for its port 3-*i* instead of the monitoring unit 16.

If the result of the analysis carried out in stage 110 does not indicate any incoherence, one moves on to the stage 120 in which the monitoring sub-unit 15-*l*M proceeds to analysis of the address field of the source port which has just been observed (and therefore reconstituted) by the probe unit 6M on the rising part 5M of the connecting interface.

As for the preceding field, a comparison is to be carried out between the source port address contained in the grid being transferred and the addresses of ports which are contained in the table of correspondence 18 (or 18-*l*).

As above, if an incoherence is detected, a warning signal is transmitted by the monitoring sub-unit 15-*l*M in the direction of the monitoring unit 16 and/or the switching element 12-*l* (by the connection 19M), according to the embodiment concerned. This will have the effect either of triggering rejection of the grid being transferred, or of incrementing by one unit of value the variable of matching of the warning signals (in the case of a statistical analysis).

If incoherence is not detected, one moves on to a stage 130, in which the monitoring sub-unit 15-*l*M proceeds to analysis of the grid type field, which is supplied by the probe unit 6M after its observation on the rising part 5M of the connecting interface.

This grid type analysis consists in checking whether the type contained in the field observed is part of a list of types which is memorised, e.g. in the memory 18 (or 18-*i*). Obviously, in a modification, instead of a list of types of grid, one may only provide a single type associated with each port.

When the type of grids does not correspond to that or those stored, a warning signal may be transmitted by the monitoring sub-unit 15-*l*M with a view either to immediate rejection or possible rejection (in the statistical case).

If there is no incoherence, the monitoring sub-unit 15-*l*M will proceed to an analysis which one might call 'dynamic' as opposed to analyses carried out at stages 100 to 130, which are rather of the 'static' type.

A data grid is not generally isolated inside a communication installation. It belongs to a flux of data which may be specific or non-specific. By way of example, in the field of avionics, there are at least three different levels of flux associated respectively with very high-level priority data, such as periodic (critical) data, high-level priority data, such as urgent aperiodic data, and low-level priority data, such as urgent non-periodic data.

One may thus authorise one or more different fluxes associated with different types of grid by means of the monitoring unit 16 in each monitoring sub-unit 15-*i*M and 15-*i*D.

In a stage 140, one or more measurements are carried out which bear on the flux associated with the type of grid detected at stage 130. It may be, for example, a measurement of the rate of global use per unit time, or per pre-determined cycle, of the port being considered (here the port 3-*l*). It might be a measurement for each type of flux identified of the length of the grid per flux. It might also be a measurement of the temporal distance between grids.

Some of these dynamic analyses of grids, in particular the two last ones, use the grid start field for their measurements, which is determined in stage 100.

The measurement of temporal distance separating two consecutive grid starts might rest on the acquisition, upon each reception of a grid start, of the current time managed by each monitoring sub-unit 15-*i*M and 15-*i*D and the comparison with the expected time for a grid of the same type.

The analysis carried out in the stage 140 therefore consists, in the rising direction, of monitoring the capacity of the source machine (or possibly of another upstream switch) to generate grids which are compatible (or coherent), in terms of the quantity of data and the quality of flux, with the port to which it is connected. In the falling direction, the analysis consists of monitoring the capacity of the processing unit 4 (or logic layer) to return correctly fluxes of data to one or more destination ports.

In general, the entirety of analyses carried out in the rising direction, on each port, consists in admission monitoring, whereas the entirety of analyses carried out in the falling direction, still on each port, consists of return monitoring.

Although the fields are transmitted as they are observed, i.e. during their transfer from one layer to another, it is possible to conceive a parallel field analysis, in particular when one of the analyses requires a longer analysis time than that necessary to analysis of the next field.

Furthermore, one might also conceive of only analysing part of a field, and not the whole field. This might be the case in particular when analysing the data field. One can conceive of placing in this data field a specific datum which, when it has a value which is different from one or more predetermined values, or even if it is not present at all, triggers a warning signal.

Nevertheless, analysis of part of the data field has some risks in that the analysis must be finished before the grid being transferred has been completely transmitted either to the logic layer, in the case of a rising grid, or to the physical layer, in the case of a falling grid.

In the above, multiple analysis was described. But obviously, it is possible to carry out single analysis, which is either static, i.e. relating to the address field of the destination port or the address field of the source field, or the grid type field, that is a purely dynamic analysis, i.e. relating to the flux associated with the type of grid.

In summary, the monitoring mechanism implemented by the monitoring device according to the invention comprises four successive stages, a first stage of observation, a second stage of detection, a third stage of action, and a fourth stage of fault containment.

Figure 5:
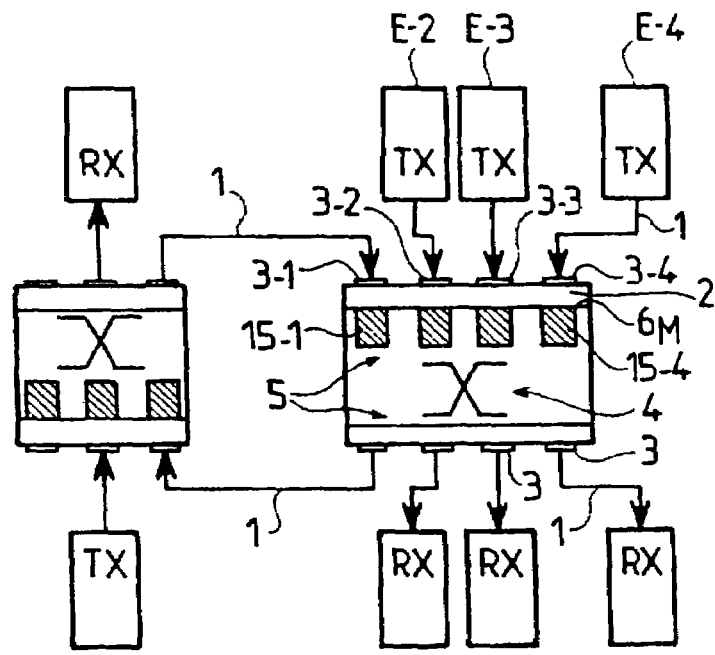
FIG. 5 illustrates diagrammatically an installation having two switches equipped with a monitoring device according to the invention.

As is shown in FIG. 5, the data grids arriving at the ports of a first switch do not necessarily originate from a machine such as a computer or sensor. In fact, they may come from any type of IT hardware operating according to the format of the switch equipped with the device according to the invention, in particular with the destination port of another switch. In the same way, the destination port of a first switch may be connected by a transmission means to the source port of a second switch. It is important to note that one of the two switches may not be equipped with a device according to the invention.

The device according to the invention comprises, preferably, a purely hardware part, consisting in particular of the probe unit and the storage memory for data specific to the analyses (such as the list of authorised addresses, the list of master templates or authorised fluxes), and of a purely software part, preferably reprogrammable, for the rest. The monitoring device according to the invention might therefore be manufactured in the form, for example, of an ASIC coupled to a modifiable memory (live or flash), or of an ASIC with a bank of registers; an ASIC capable of ensuring monitoring or one or more ports.

By virtue of the invention, it is possible to effect monitoring/detection in real time, which makes it possible to act on the current grid (principle of "fault containment"). Moreover, the performance of the switch is not impaired, since the monitoring/detection is carried out in parallel. Finally, this invention makes it possible to obtain very low non-detected error rates, as there is total dissociation of the implementation of the principle (monitoring mechanism) relative to the object being monitored, i.e. between the transfer and the switching of data; in other words, there is no link between monitoring and transfer.

The invention is not limited to the embodiments described above, but covers all modifications which might be developed by the person skilled in the art in the context of the claims below.

Thus embodiments have been described in which each port of the switch is monitored by the device according to the invention. However, one may conceive that only some of the ports are monitored, e.g. only the input (source) ports or only the output (destination) ports, or any combination of input/output ports.

The invention further covers switches equipped with a device according to the invention, as well as communication installations equipped with one or more switches equipped with a device according to the invention.

Furthermore, the invention has been described with reference to the analysis of grids with ETHERNET format. But the invention relates to other types of grid, such as those of the ATM type, or those comprising more generally physical and/or logic fields or channels. In these embodiments, the unit will therefore be actuated so as to see one or more of their respective fields and the monitoring unit will effect its comparison preferably on the Virtual Path Identifier field, then on the Virtual Channel Identifier field, and on the logic channel field, then on the physical channel field respectively.

The invention claimed is:

1. A monitoring device for a multichannel digital switch, the switch including a connecting interface for connecting physical connection circuits to a transmission medium, defining at least one of source and destination ports, the connecting interface including a physical layer and a logical layer, and a processing unit for carrying out selective switching of multifield data cells between the different ports, the monitoring device comprising:
a probe unit coupled selectively to the connecting interface, configured to separately observe data transmitted from the physical layer to the logical layer, and data transmitted from the logical layer to the physical layer; and
a monitoring unit configured to analyze contents of at least part of the data cells probed by the probe unit, to generate a warning message to the logical layer when the part analyzed does not meet a selected condition and to make the warning message compatible with an associated port of the logical layer, to output the warning message to the logical layer, and to trigger rejection of a cell probed by the probe unit upon transmission of the warning message.

2. The device according to claim 1, wherein the monitoring unit is further configured to analyze contents of at least part of a field of the data cells probed by the probe unit.

3. The device according to claim 2, wherein the monitoring unit is further configured to analyze contents of at least part of a field of each cell probed by the probe unit.

4. The device according to claim 1, wherein the probe unit is configured to probe cells including at least one of a logic channel field, a physical channel field, and a data field.

5. The device according to claim 4,
wherein the monitoring unit comprises a table of correspondence specifying for each port connected to the connection circuits a list of authorized cells comprising at least the ports with which the respective port can exchange the cells, and wherein the monitoring unit is further configured to compare contents of this table of correspondence to that of at least one of the fields of the cell being transferred, to generate the warning message when its field or fields analyzed designate a port that does not have a correspondence with the source port transmitting the cell, this correspondence forming a chosen condition.

6. The device according to claim 5, wherein the analyzed field or fields is or are chosen from at least the logic channel field and the physical channel field.

7. The device according to claim 6, wherein the monitoring unit is configured to effect its comparison on the logic channel field, then on the physical channel field.

8. The device according to claim 5, wherein the table of correspondence includes for each source or destination port at least one list of associated destination addresses, a list of associated source addresses, a list of cell flux types authorized on the port, accompanied by temporal features of each of the fluxes, and a list of the cell lengths authorized to circulate on the port.

9. The device according to claim 8, wherein the table of correspondence is stored in a modifiable memory selected from at least a live memory, a flash memory, and an assembly of registers each associated with a port and having an individually configurable content.

10. The device according to claim 5, wherein the monitoring unit is further configured to determine whether contents of the data field of the cell probed by the probe unit has a predetermined format, and to generate the warning message when at least part of the data field does not verify the format, this verification of format forming the chosen condition.

11. The device according to claim 5, wherein the monitoring unit is further configured to determine a type of cell probed by the probe unit by analyzing contents of a type field of the cell, to generate the warning message when the type field does not correspond to a predetermined type-associated with the port having transmitted the cell, this verification of type forming the chosen condition.

12. The device according to claim 5, wherein the monitoring unit is further configured to measure outputs of cells probed by the probe unit, according to a type for the cells, and to generate the warning message when the measured output associated with the type for the cells does not correspond to a predetermined output, this verification of output forming the chosen condition.

13. The device according to claim 5, wherein the monitoring unit is further configured to measure for each source port a temporal distance between cells of a same type which it has transmitted, and to generate the warning message when the temporal distance measured associated with its type does not correspond to a predetermined distance, this verification of distance forming the chosen condition.

14. The device according to claim 5, wherein the monitoring unit is further configured to measure for each destination port a temporal distance between cells of a same type that it has received, and to generate the warning message when the distance measured associated with its type does not correspond to a predetermined temporal distance, this verification of distance forming the chosen condition.

15. The device according to claim 4, wherein the monitoring unit is further configured to measure a length of each cell probed by the probe unit, and to generate the warning message when its measured length does not correspond to a predetermined length associated with its type, this verification of length forming the chosen condition.

16. The device according to claim 4, wherein the monitoring unit is configured to make compatible at each port a number of cells the port transmits and a number of cells the port receives-to estimate for each port a rate of use, and to trigger invalidation of a connection between a port and the connection circuits to which the port is connected when the estimated rate of use for the port does not correspond to a predetermined rate associated with the type of cell of the port.

17. The device according to claim 1, wherein the probe unit is configured to probe cells including at least one of a cell start field, a destination port address field, a source port address field, and a data field.

18. The device according to claim 17,
wherein the monitoring unit comprises a table of correspondence specifying for each port connected to the connection circuits a list of authorized cells comprising at least the ports with which the respective port can exchange the cells, and wherein the monitoring unit is further configured to compare contents of this table of correspondence to that of at least one of the fields of the cell being transferred, to generate the warning message when its field or fields analyzed designate a port that does not have a correspondence with the source port transmitting the cell, this correspondence forming a chosen condition.

19. The device according to claim 18, wherein the analyzed field or fields is or are chosen from at least the destination port address field of the cell and the source port address field of the cell.

20. The device according to claim 19, wherein the monitoring unit is configured to effect its comparison on the destination address field, then on the source address field.

21. The device according to claim 1, wherein the probe unit is configured to probe cells including at least one of a virtual path identifier field, a virtual channel identifier field, a payload type field, and a data field.

22. The device according to claim 21,
wherein the monitoring unit comprises a table of correspondence specifying for each port connected to the connection circuits a list of authorized cells comprising at least the ports with which the respective port can exchange the cells, and wherein the monitoring unit is further configured to compare contents of this table of correspondence to that of at least one of the fields of the cell being transferred, to generate the warning message when its field or fields analyzed designate a port that does not have a correspondence with the source port transmitting the cell, this correspondence forming a chosen condition.

23. The device according to claim 22, wherein the analyzed field or fields is or are chosen from at least the virtual path identifier field and the virtual channel identifier field.

24. The device according to claim 23, wherein the memory is configured to permit access by writing and/or reading for monitoring.

25. The device according to claim 23, wherein the monitoring unit is configured to effect its comparison on the virtual path identifier field, then on the virtual channel identifier field.

26. The device according to claim 1, wherein the monitoring unit is configured to trigger invalidation of a connection between the port and the connection circuits when a number of generated warning messages made compatible for the port is higher than a threshold.

27. The device according to claim 1, wherein the monitoring unit is configured to trigger rejection by the processing unit of the cell seen by the probe unit when a number of generated warning messages made compatible for the port is higher than a threshold.

28. The device according to claim 1, wherein the monitoring unit is configured to trigger rejection by the processing unit of the cell probed by the probe unit when a number of generated warning messages made compatible for the port is higher than a threshold.

29. The device according to claim 1, wherein the monitoring unit is configured, upon transmission of the warning message, to trigger the processing unit to reject the cell probed by the probe unit.

30. The device according to claim 1, wherein the monitoring unit is configured to trigger invalidation of the connection between a selected port and the connecting circuits when a number of rejections made compatible for the selected port is higher than a threshold.

31. A switch, comprising the device according to claim 1.

32. A communication installation, comprising at least one switch equipped with at least one device according to claim 1, the ports of the switch being connected to machines and computers.

33. The communication installation according to claim 32, wherein the communication installation is implanted in an airship comprising a flight management computer and a flight control computer.

34. The monitoring device according to claim 1, wherein the monitoring unit is further configured to determine whether an address of a destination cell of the data does not correspond to the port analyzed by the respective monitoring unit.

35. The monitoring device according to claim 1, wherein the monitoring unit is configured to at least invalidate a connection between the port and the connection circuits, or reject the cell observed by the probe unit, based on a number of generated warning messages.

36. The monitoring device according to claim 35, wherein the monitoring unit is configured to compare the number of generated warning messages with a threshold value.

37. A monitoring device for a multichannel digital switch, the switch including a connecting interface for connecting physical connection circuits to a transmission medium, defining at least one of source and destination ports, and a processing unit for carrying out selective switching of multifield data cells between the different ports, the monitoring device comprising:
   a probe unit coupled selectively to the connecting interface; and
   a monitoring unit configured to analyze contents of at least part of the data cells probed by the probe unit, and configured to generate a warning message when the part analyzed does not meet a selected condition,
   wherein the probe unit is configured to probe cells including at least one of a logic channel field, one physical channel field, and a data field,
   wherein the monitoring unit comprises a table of correspondence specifying for each port connected to the connection circuits a list of authorized cells comprising at least the ports with which the respective port can exchange the cells,
   wherein the monitoring unit is further configured to compare contents of this table of correspondence to that of at least one of the fields of the cell being transferred, to generate the warning message when its field or fields analyzed designate a port that does not have a correspondence with the source port transmitting the cell, this correspondence forming a chosen condition, and to make the warning message compatible with an associated port of the connection interface, and
   wherein the monitoring unit is configured to at least invalidate a connection between the port and the connection interface, or reject the cell probed by the probe unit, based on a number of generated warning messages.

38. The monitoring device according to claim 37, wherein the monitoring unit is configured to compare the number of generated warning messages with a threshold value.

* * * * *